(No Model.)
J. W. REED.
DOUGH KNEADER AND ROLLER.
No. 305,474.  Patented Sept. 23, 1884.
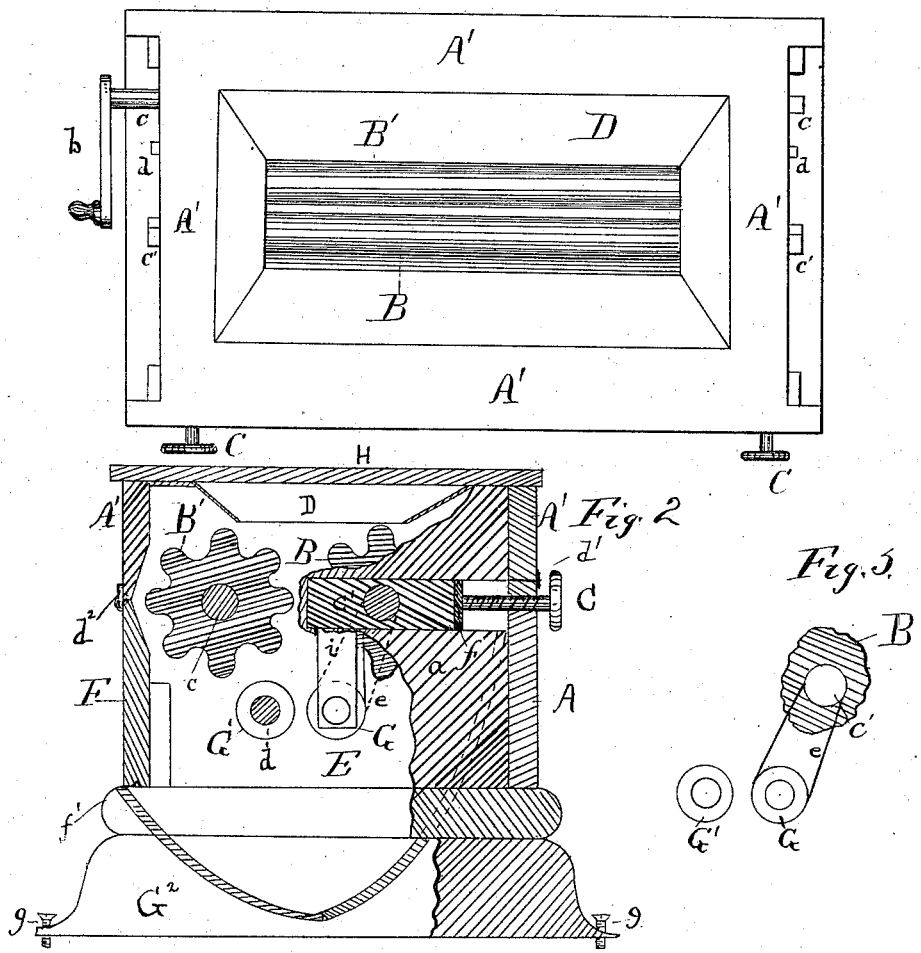
Witnesses,
A. E. Underwood
L. C. Barry
Inventor.
Judy W. Reed
By Edw. J. Underwood
Attorney

United States Patent Office.

JUDY W. REED, OF WASHINGTON, DISTRICT OF COLUMBIA.

DOUGH KNEADER AND ROLLER.

SPECIFICATION forming part of Letters Patent No. 305,474, dated September 23, 1884.

Application filed January 21, 1884. (No model.)

*To all whom it may concern:*

Be it known that I, JUDY W. REED, a citizen of the United States, residing at Washington, in the District of Columbia, have invented certain new and useful Improvements in Dough Kneaders and Rollers; and I do declare the following to be a full, clear, and exact description of the invention, such as will enable others skilled in the art to which it appertains to make and use the same, reference being had to the accompanying drawings, and to the letters or figures of reference marked thereon, which form a part of this specification.

My invention relates to improvements in dough kneaders and rollers; and it consists in certain peculiarities of construction, to be hereinafter described in the specification and illustrated in the drawings.

The objects of my invention are, first, to subject the mass of dough to a thorough and equable mixing and working by causing it to pass between a pair of intermeshing corrugated rollers or cylinders, which are arranged to approach or recede from each other through the agency of regulating-screws, according as the pressure on the dough is desired to be increased or diminished, and then passing it between a pair of plain rollers to roll the dough; second, to provide a covered receiver for the dough before it passes through the rolls, and a receptable for the kneaded and rolled dough; and, third, to protect the mass of dough from dust or impurities in the atmosphere throughout its working or manipulation.

In the accompanying drawings, in which the same parts are represented by the same letters in the several figures, Figure 1 is a top view of the machine with the cover removed. Fig. 2 is a vertical cross-section through the line of one of the regulating-screws and elastic pressure-plates, and Fig. 3 is a detached view of part of the mechanism.

A A' is the box or case of my device, containing the corrugated metallic rolls B and B' and the plain rollers G and G', one of which, B', is provided with a crank or handle, $b$, by which they are actuated. The rolls B B' are journaled in bearings at the ends of the case A, the roll B' being held immovable laterally by the bearings $c\ c$, which are secured to the case; or the ends of the spindles of B' may revolve in the ends of the case, while the other roll, B, is held in movable bearings $c'\ c'$, which slide on the end pieces, $a\ a$, of the case A, their movement being regulated by the screws C C, which pass through and work in threaded openings in the back of the case, and impinge on rubber plates $f\ f$ on the movable bearings $c'\ c'$ of the roll B, and press it up to keep it in contact with the roll B'. The plain roller G' is journaled in the ends of the case at $d$, and the plain roller G is suspended in hangers $i$, attached to the movable bearings $c'$ of roll B, and moves with said bearings, and has a belt, $e$, which passes over the axle of B and around the roller G to impart motion, and as B is moved up by the screws C to mesh with B', so G by the same movement of the bearing $c'$ is brought into contact with G', which it moves by friction therewith.

The machine is divided into two unequal parts by the rolls, the upper and smaller part, A', being provided with a hopper-shaped receiver or trough, D, which part A' is attached to the case by hinges $d'$ at the back, so that it can be swung over to permit the rolls to be separated or removed for cleaning, and this receiver is preferably lined with tin or other thin metal to prevent any taste of the wood or other material of which the receiver is made being imparted to the dough. Below the rolls is the receptacle E for the dough after it is kneaded and rolled by passing through the rollers. This is large enough to contain several charges of the receiving-trough, and, like the receiver, is preferably lined with thin metal, which will not impart an objectionable taste to the dough.

The part A', containing the receiver D, being connected with the case by hinges $d'$ and a hook, $d^2$, when closed, holds the movable bearings $c'$ in place on the end pieces, $a$, of the case. The front of the receptacle E has a door, F, which opens to enable the manipulated dough to be removed, and when closed prevents the entry of dust to the dough-receptacle. The door F is preferably not hinged, but its lower edge is perforated to receive pins $f'$ and is secured by the hook $d^2$. The part A', with the receiver D, is provided with a closely-fitting cover, H, to exclude dust therefrom, and when a charge of dough is introduced it is kept clean during its passage through the rolls.

The operation of the device is as follows: Remove the cover and fill the receiver D with dough, then replace the cover and revolve the crank toward the rear and the dough will be drawn between the corrugated rolls B and B', and the lower or plain rollers G and G', and be thoroughly kneaded and rolled, and fall into the receptacle below in a continuous sheet or ribbon, whence it can be removed by opening the door F, and the operation can be repeated as often as desired, though one passage through the rolls is generally sufficient, as the pressure can be regulated by the screws C, while the elastic plates keep the rolls always in contact.

The machine is supported on rests or feet $G^2$, which may stand on a table or other surface, or be attached thereto by screws $g$, passing through openings in the rests.

Having thus fully described my invention, what I claim therein as new, and desire to secure by Letters Patent, is—

1. A dough kneader and roller consisting of a wooden case or box containing a pair of corrugated intermeshing metallic cylinders or rolls journaled in its ends, one being immovable laterally and provided with a crank to actuate the device and the other being movable, and a pair of plain rollers connected with one of the corrugated rolls by a belt, the case being divided on the axial line of said rolls into two parts, the upper of which is provided with a hopper to receive the dough and deliver it to the rolls, and the lower forms a receptacle for the treated dough, all as described.

2. In a dough kneader and roller, the combination of the case A, the corrugated cylinders or rolls B B', the plain rollers G G', the belt $e$, the crank $b$, and the receptacle E, all as described.

3. In a dough kneader and roller, the combination of the hinged part A', containing the receiver D, the dough-receptacle E, the intermeshing corrugated cylinders B B', the plain rollers G G', the belt-connection $e$, the regulating-screws C, the elastic plates $f$, the movable bearings $c'$, with the case A, provided with the door F, and the cover H, all substantially as shown and described.

In testimony whereof I affix my signature in presence of two witnesses.

JUDY W. <sub>her</sub> ✕ <sub>mark.</sub> REED.

Witnesses:
 LEWIS McKENZIE,
 JOHN AMBLER SMITH.